US012416778B2

(12) United States Patent
Jun et al.

(10) Patent No.: US 12,416,778 B2
(45) Date of Patent: Sep. 16, 2025

(54) LENS ACTUATOR AND CAMERA MODULE INCLUDING SAME

(71) Applicant: SAMSUNG ELECTRO-MECHANICS CO., LTD., Suwon-si (KR)

(72) Inventors: Jae Woo Jun, Suwon-si (KR); Yun Kyoung Choi, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 744 days.

(21) Appl. No.: 17/665,713

(22) Filed: Feb. 7, 2022

(65) Prior Publication Data

US 2022/0365311 A1    Nov. 17, 2022

(30) Foreign Application Priority Data

May 17, 2021    (KR) .......................... 10-2021-0063381

(51) Int. Cl.
*G02B 7/09* (2021.01)
*G02B 7/10* (2021.01)
*G03B 3/10* (2021.01)

(52) U.S. Cl.
CPC .............. *G02B 7/09* (2013.01); *G02B 7/102* (2013.01); *G03B 3/10* (2013.01)

(58) Field of Classification Search
CPC ........ G02B 7/09; G02B 7/102; G02B 27/646; G03B 3/10; G03B 2205/0023;

(Continued)

(56) References Cited

U.S. PATENT DOCUMENTS

| 8,848,064 B2 * | 9/2014 | Topliss | H04N 23/68 |
| | | | 348/208.7 |
| 2002/0001467 A1 * | 1/2002 | Tanaka | G03B 17/425 |
| | | | 396/177 |

(Continued)

FOREIGN PATENT DOCUMENTS

| CN | 103597394 A | 2/2014 |
| JP | 2003-66309 A | 3/2003 |

(Continued)

OTHER PUBLICATIONS

Korean Office Action issued on Apr. 21, 2023, in counterpart Korean Patent Application No. 10-2021-0063381 (5 pages in English, 4 pages in Korean).

(Continued)

*Primary Examiner* — Thomas K Pham
*Assistant Examiner* — Jennifer A Jones
(74) *Attorney, Agent, or Firm* — NSIP Law

(57) ABSTRACT

A lens actuator includes: a lens barrel accommodating one or more lenses; and a driving unit to move the lens barrel along an optical axis direction. The driving unit includes a driving wire, at least a portion of which is extended in the optical axis direction, and a length of which is changed as voltage is applied thereto, and a driving transmission unit connected to the driving wire to move the lens barrel along the optical axis direction as the length of the driving wire is changed such that a distance by which the lens barrel is moved by the driving transmission unit is greater than an amount of change in the length of the driving wire.

18 Claims, 9 Drawing Sheets

(58) Field of Classification Search
CPC ...... G03B 2205/003; G03B 2205/0046; G03B 2205/0069; G03B 2205/0084; G03B 5/00; G03B 13/36; G03B 30/00; G03B 5/04; G03B 17/12; G03B 2205/0015; H04N 23/55

See application file for complete search history.

(56) References Cited

U.S. PATENT DOCUMENTS

| | | | | |
|---|---|---|---|---|
| 2009/0135395 | A1* | 5/2009 | Melzer | G02B 7/023 |
| | | | | 355/67 |
| 2013/0028581 | A1* | 1/2013 | Yeung | G02B 7/021 |
| | | | | 396/73 |
| 2014/0168793 | A1 | 6/2014 | Fukino | |
| 2016/0044232 | A1 | 2/2016 | Kim et al. | |
| 2018/0321504 | A1 | 11/2018 | Hu et al. | |
| 2020/0409030 | A1* | 12/2020 | Li | F03G 7/065 |

FOREIGN PATENT DOCUMENTS

| | | | |
|---|---|---|---|
| JP | 2003-344903 | A | 12/2003 |
| JP | 2006-329111 | A | 12/2006 |
| JP | 2007-333792 | A | 12/2007 |
| JP | 2011-215351 | A | 10/2011 |
| JP | 2018194739 | A * | 12/2018 |
| KR | 10-2007-0019893 | A | 2/2007 |
| KR | 10-2012-0052921 | A | 5/2012 |
| WO | WO-2015045728 | A1 * | 4/2015 ........... G02B 13/009 |

OTHER PUBLICATIONS

Chinese Office Action Issued on Mar. 27, 2024, in Counterpart Chinese Patent Application No. 202210464821.5 (4 Pages in English, 7 Pages in Chinese).

Korean Office Action issued on Oct. 7, 2022, in counterpart Korean Patent Application No. 10-2021-0063381 (5 pages in English, 4 pages in Korean).

* cited by examiner

LENS ACTUATOR AND CAMERA MODULE INCLUDING SAME

CROSS-REFERENCE TO RELATED APPLICATION(S)

This application claims the benefit under 35 USC 119(a) of Korean Patent Application No. 10-2021-0063381 filed on May 17, 2021 in the Korean Intellectual Property Office, the entire disclosure of which is incorporated herein by reference for all purposes.

BACKGROUND

1. Field

The following description relates to a lens actuator and a camera module including the same.

2. Description of Background

A camera module has been basically used in a portable electronic device such as a tablet personal computer (PC) or a laptop computer as well as a smartphone, and an autofocus (AF) function, an optical image stabilization (OIS) function, a zoom function and the like have been added to a camera module for a mobile terminal.

In addition, the camera module may include an actuator that directly moves a lens or indirectly moves a reflection module including the reflective member, for image stabilization. In general, the actuator may also move the lens or the reflection module using driving force generated by a magnet and a coil.

Meanwhile, there has been increasing demand for high-definition and high-magnification captured using a small camera module such as the camera module for a mobile terminal. However, in the prior art, it is difficult to implement a zoom function with high magnification by driving a plurality of lens groups.

In particular, when the plurality of lens groups are moved using the actuator including the magnet and the coil, it may be difficult for the camera module to have a small size due to sizes of the magnet and the coil, included in the actuator.

In addition, when the plurality of lens groups are moved using the actuator including the magnet and the coil, the actuator may consume a large amount of power and it may be difficult to precisely control the plurality of lens groups.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a lens actuator includes: a lens barrel accommodating one or more lenses; and a driving unit configured to move the lens barrel along an optical axis direction. The driving unit includes: a driving wire, at least a portion of which is extended in the optical axis direction, and a length of which is changed as voltage is applied thereto; and a driving transmission unit connected to the driving wire and configured to move the lens barrel along the optical axis direction as the length of the driving wire is changed such that a distance the lens barrel is moved by the driving transmission unit is greater than an amount of change in the length of the driving wire.

As the voltage or current is applied to the driving wire, at least a portion of the driving wire may be contracted in the optical axis direction.

The driving transmission unit may include: a crank gear connected to the driving wire and configured to rotate about a rotation axis crossing an optical axis; a pulley gear configured to rotate while meshing with the crank gear; and a guide wire connected to the pulley gear and configured to move as the pulley gear is rotated, and the lens barrel may be fixed to at least a portion of the guide wire.

A first end of the crank gear may be connected to the driving wire, a second end of the crank gear may mesh with the pulley gear, and a distance from the first end of the crank gear to the rotation axis of the crank gear may be shorter than a distance from the second end of the crank gear to the rotation axis of the crank gear.

The pulley gear may include a first wheel meshing with the second end of the crank gear and a second wheel to which the guide wire is connected, and an outer diameter of the second wheel may be greater than an outer diameter of the first wheel.

The second end of the crank gear and an outer ring of the first wheel of the pulley gear may be teeth-coupled to each other.

The driving wire may include a first driving wire configured to rotate the crank gear in a first direction as a length of the first driving wire is reduced and a second driving wire configured to rotate the crank gear in a second direction opposite to the first direction as a length of the second driving wire is reduced, and changes in the lengths of the first driving wire and the second driving wire may be controlled independently of each other.

One or both of the first driving wire and the second driving wire may be made of a shape memory alloy, a length of which is changed when the voltage is applied thereto.

The lens actuator may include a wire connection member connecting one or both of the first driving wire and the second driving wire to the crank gear, and the wire connection member may include a conductive material.

The driving transmission unit may include: a crankshaft supporting the crank gear; and a crank fixation member disposed at an end of the crankshaft to support the crank gear so as not to be separated from the crankshaft.

The driving transmission unit may include a sub-pulley gear spaced apart from the pulley gear in the optical axis direction, the guide wire may connect the pulley gear and the sub-pulley gear to each other, and the lens barrel may be connected to the guide wire between the pulley gear and the sub-pulley gear.

A fixation groove, to which at least a portion of the guide wire is fixed, may be disposed in an outer circumferential surface of the pulley gear.

The driving transmission unit may include a guide gear disposed between the pulley gear and the sub-pulley gear, and configured to guide at least a portion of the guide wire to be moved in a direction parallel to the optical axis direction.

In another general aspect, a lens actuator may includes: a lens barrel accommodating one or more lenses; and a driving unit configured to move the lens barrel in an optical axis direction. The driving unit includes a first driving wire and a second driving wire at least a portion of each of which is extended along the optical axis direction, and a length of each of which is changed as voltage is applied thereto, and a driving transmission unit configured to move the lens barrel in a first direction parallel to the optical axis direction as the length of the first driving wire is contracted, and to move the lens barrel in a second direction opposite to the first direction as the length of the second driving wire is contracted.

The first driving wire and the second driving wire may be disposed opposite to each other in a direction crossing the optical axis direction.

A camera module may include the plurality of lens actuators, and respective driving units included in each of the plurality of lens actuators may be controlled independently of each other.

In another general aspect, a lens actuator includes: a lens barrel including one or more lenses; a driving wire configured to extend and contract in an optical axis direction as voltage is applied thereto; and a driving transmission connected to the driving wire and configured to move the lens barrel along the optical axis direction as the length of the driving wire is changed such that a distance the lens barrel is moved by the driving transmission unit is greater than an amount of change in the length of the driving wire. The driving transmission includes: a crank gear connected to the driving wire and configured to rotate about a rotation axis crossing an optical axis; and a pulley gear configured to rotate while meshing with the crank gear. A first end of the crank gear is connected to the driving wire, a second end of the crank gear is connected with the pulley gear, and a distance from the first end of the crank gear to the rotation axis of the crank gear is different than a distance from the second end of the crank gear to the rotation axis of the crank gear.

The distance from the first end of the crank gear to the rotation axis of the crank gear may be less than the distance from the second end of the crank gear to the rotation axis of the crank gear.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
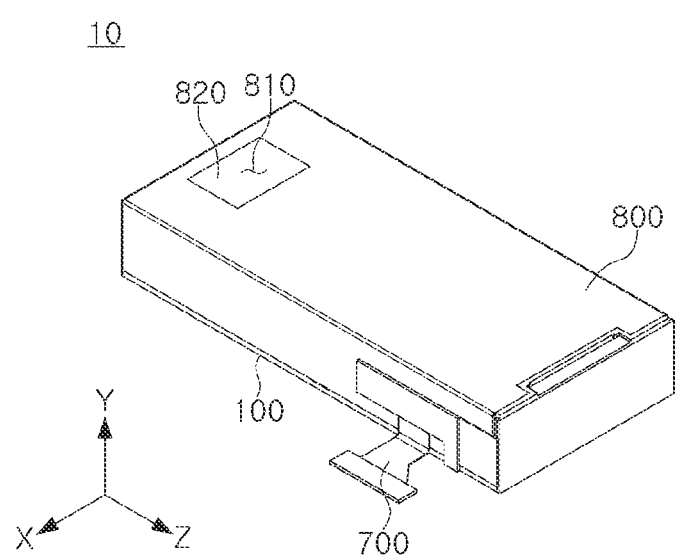
FIG. 1 is a perspective view of a camera module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

Hereinafter, various examples will be described in detail with reference to the accompanying drawings.

Figure 2:
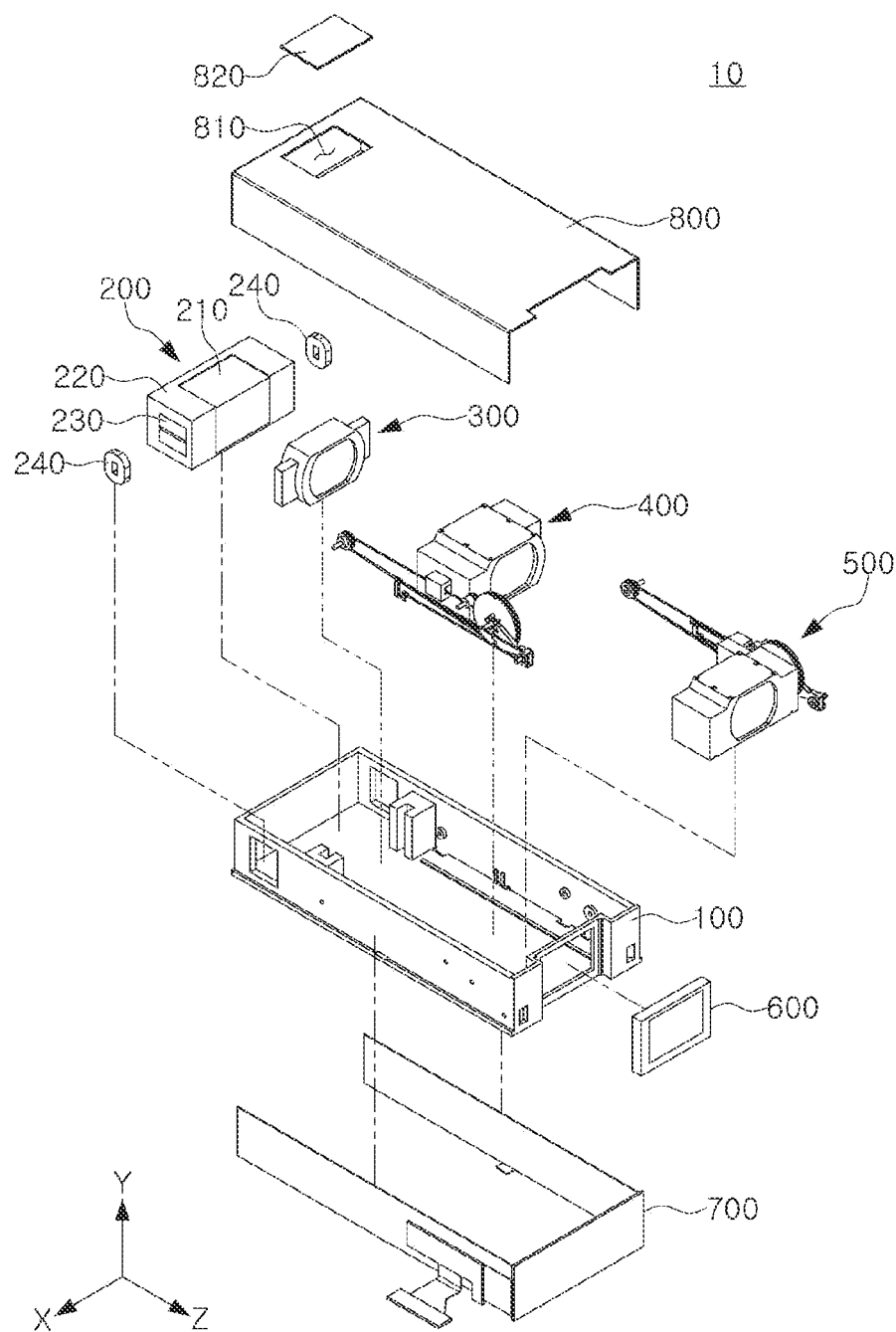
FIG. 2 is an exploded perspective view of a camera module.

FIG. 1 is a perspective view of a camera module 10 according to an example; and FIG. 2 is an exploded perspective view of the camera module 10.

The camera module 10 may include a reflection module and one or more lens actuators 400 and 500 in an internal space of a housing 100 and an upper cover 800, forming an appearance of the camera module 10.

The camera module 10 may be positioned in a portable electronic device, such as a mobile communications terminal, a smartphone or a tablet personal computer (PC), to capture a subject outside the electronic device. To this end, the camera module 10 may include one or more lens actuators 400 and 500 in the housing 100.

When the camera module 10 includes the plurality of lens actuators 400 and 500, an optical axis direction of the lens included in the plurality of lens actuators 400 and 500 positioned in the camera module 10 may be a direction (e.g., Z-axis direction) perpendicular to a thickness direction (e.g., Y-axis direction) of the camera module 10. Therefore, the camera module 10 may not have an increased overall thickness even when having the plurality of lens actuators 400 and 500, and may be easily accommodated in an internal space of the mobile communications terminal, tablet PC or the like.

Figure 3:
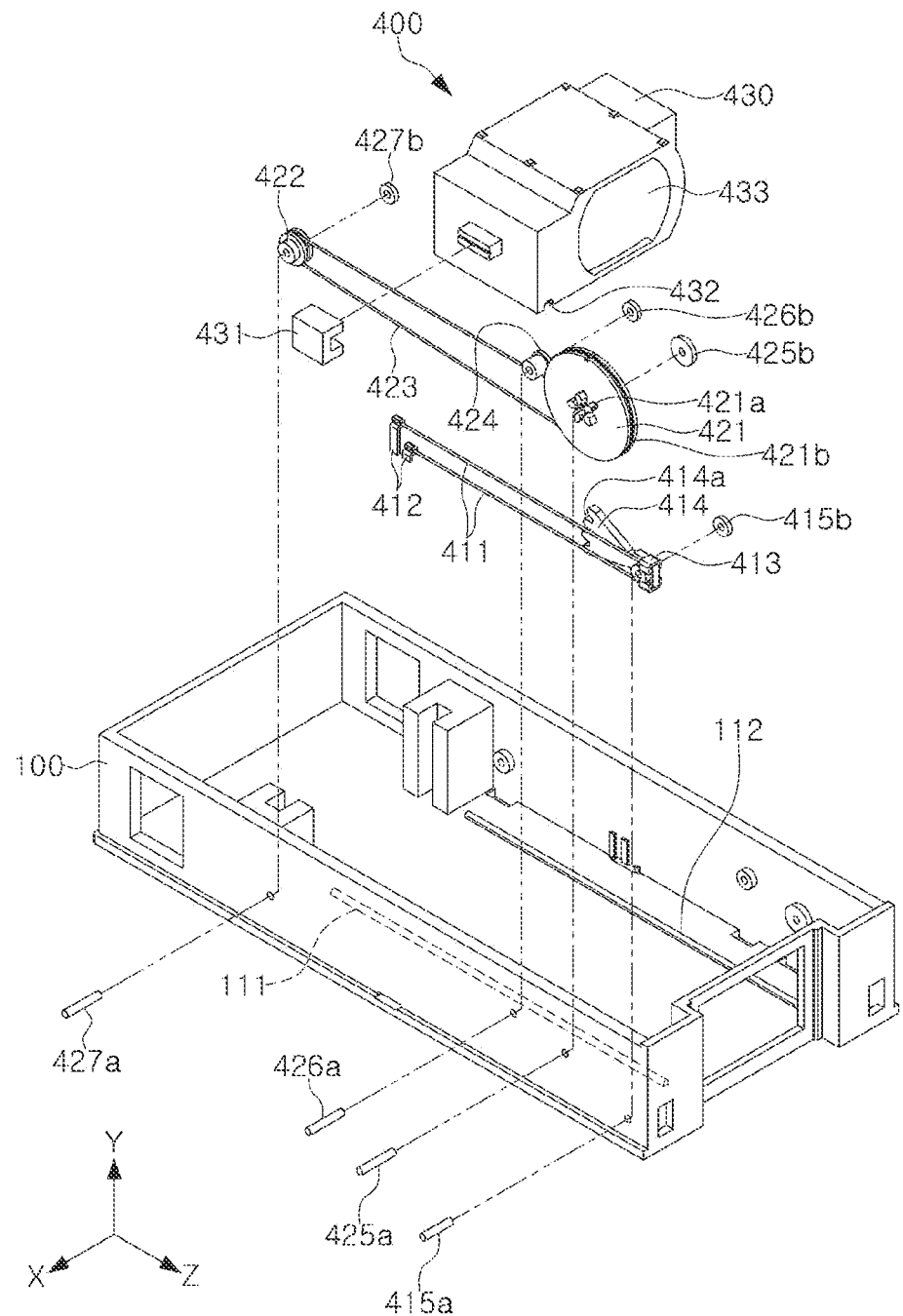
FIG. 3 is an exploded perspective view of a lens actuator.

The lens actuators 400 and 500 may each include a driving unit adjusting positions of the plurality of lenses 433 (in FIG. 3 for example). The camera module 10 may use each driving unit of the lens actuators 400 and 500 to move the lens in the housing 100 or adjust a distance between the plurality of lenses, thereby performing an autofocus function, a zoom function and an image stabilization (OIS) function.

As having a more complex structure, and the increasing number of lenses positioned in the housing 100, the camera module 10 may require the driving unit which may precisely adjust the positions of the plurality of lenses. In particular, the plurality of stacked lenses is required to be accurately and quickly moved in the optical axis direction to perform the zoom function of high magnification, and a performance of the driving unit driving the lenses may thus be more important. However, a conventional lens actuator including a magnet and a coil is difficult to precisely control the plurality of lenses.

In order to solve this problem, the various examples disclosed herein include the lens actuators 400 and 500 each including the driving unit which may accurately and quickly move the plurality of lenses, and the camera module 10 including the same. Hereinafter, the description describes the lens actuators 400 and 500 and a configuration of the camera module 10 including the same in detail with reference to FIG. 2.

The camera module 10 may include a reflection module 200 which may change a propagation path of incident light, the one or more lens actuators 400 and 500 positioned adjacent to the reflection module 200, and an image sensor module 600 positioned behind the lens actuators 400 and 500. The reflection module 200, the lens actuators 400 and 500 and the image sensor module 600 may be accommodated in the housing 100, and may be electrically connected to a substrate 700. The housing 100 may have an open top and may accommodate the reflection module 200 and the one or more lens actuators 400 and 500. The upper cover 800 may cover the top of the housing 100 to protect the reflection module 200 accommodated in the housing 100, and the one or more lens actuators 400 and 500 from an external environment. The upper cover 800 may include an opening 810 through which the incident light is incident, and the reflection module 200 may be disposed under the opening 810. Therefore, the incident light incident in a height direction (e.g., Y-axis direction) of the housing 100 through the opening 810 of the upper cover 800 may change its propagation path through the reflection module 200 disposed under the opening 810. A protection member 820, which may protect the reflection module 200 from the external environment, may be positioned in the opening 810 of the upper cover 800.

The reflection module 200, the lens actuators 400 and 500 and the image sensor module 600 may be sequentially arranged in the housing 100 from one side to the other side (for example, along the Z-axis direction). The housing 100 may have the internal space in which the reflection module 200, the lens actuators 400 and 500 and the image sensor module 600 are inserted. The substrate 700, which is electrically connected to each driving unit of the lens actuators 400 and 500 or the image sensor module 600, may be attached to the inside or outside of the housing 100. The housing 100 may be formed as one whole piece to insert all of the reflection module 200 and the lens actuators 400 and 500 in its internal space. However, the configuration is not limited thereto, and may have separate housings into which the reflection module 200 and the lens actuators 400 and 500 are respectively inserted, and which are interconnected to each other for example.

The housing 100 may be covered by the upper cover 800 for its internal space not to be visible. The upper cover 800 may have the opening 810 in which the light is incident, and the light incident through the opening 810 may have its propagation direction changed by the reflection module 200 to be incident on the lens actuators 400 and 500. The upper cover 800 may be one piece to cover the entire housing 100, or may be formed as separate members respectively covering the reflection module 200 and the lens actuators 400 and 500. The propagation path of the light incident through the opening in the thickness direction (e.g., Y-axis direction) of the camera module 10 may be changed to be in a direction approximately coinciding with the optical-axis direction (e.g., Z-axis direction) by the reflection module 200.

The reflection module 200 may change the propagation path of the incident light to be in the optical axis direction (e.g., Z-axis direction) of each of the lens actuators 400 and 500. The reflection module 200 may include a reflection member 210 capable of changing the propagation path of the light, a reflection member holder 220 supporting the reflection member 210, and a reflection module driving unit moving the reflection member holder 220.

The reflection member 210 may change the propagation path of the incident light by reflecting or refracting the same. For example, the reflection member 210 may be a prism having a reflection surface. The reflection member 210 may be accommodated in the reflection member holder 220 and moved based on the housing 100. As the reflection member 210 is properly moved, the incident light incident in the height direction (e.g., Y-axis direction) of the housing 100 may have the propagation path changed in the optical-axis direction (e.g., Z-axis direction) of each of the lens actuators 400 and 500.

The reflection member holder 220 may support the reflection member 210 to be movable. The reflection member holder 220 may be rotated or moved based on the housing 100 by the reflection module driving unit. The reflection module driving unit may be electrically connected to the substrate 700, and may receive energy from an external source to rotate or move the reflection member holder 220. For example, as shown in FIG. 2, the reflection module driving unit may include a magnet 230 attached to the reflection member holder 220 and a coil 240 (or coils 240) positioned in the housing 100 and electrically connected to the substrate 700. When current or voltage is applied to the coil 240 of the reflection module driving unit, an electromagnetic force may be generated by interaction between the magnet 230 and the coil 240, and the generated electromagnetic force may be used to rotate or move the reflection member holder 220. However, the reflection module driving unit according to this configuration, shown in FIG. 2, is only an example, and may include a coil positioned on the reflection member holder 220 and a magnet positioned in the housing 100.

The reflection module 200 may properly rotate or move the reflection member 210, thereby either changing the propagation path of the incident light to be in a direction coincide with the optical axis direction of each of the lens actuators 400 and 500, or performing the image stabilization function in response to vibration outside the camera module 10.

The camera module 10 may include the one or more lens actuators 400 and 500 adjacent to the reflection module 200. For example, as shown in FIG. 2, the camera module 10 may include the first lens actuator 400 and the second lens actuator 500, positioned between the reflection module 200 and the image sensor module 600. At least one of the first lens actuator 400 and the second lens actuator 500 may be moved in the optical axis direction (Z-axis direction). The lens actuators 400 and 500 may each be moved in the optical axis direction (Z-axis direction) by driving force generated by the driving unit. The movements of the lens actuators 400 and 500 are described below with reference to FIGS. 3 through 8. The camera module 10 may move at least one of the plurality of lens actuators 400 and 500 in the optical axis direction (Z-axis direction) to perform the zoom function or the autofocus function.

The camera module 10 may include one or more fixed lens units 300 to adjust a refraction degree of the incident light when performing the zoom function or the autofocus function. For example, as shown in FIG. 2, the camera module 10 may include the fixed lens unit 300 positioned between the reflection module 200 and the lens actuators 400 and 500 adjacent thereto. The fixed lens unit 300 may be fixedly positioned in the housing 100. Accordingly, light emitted from the reflection module 200 may be incident on the image sensor module 600 through the fixed lens unit 300 and the one or more lens actuators 400 and 500.

The image sensor module 600 may be positioned behind the lens actuators 400 and 500. The incident light passed through the lens actuators 400 and 500 may be incident on the image sensor module 600 to form an image. The image sensor module 600 may convert the incident light into an electrical signal.

The camera module 10 may include the reflection module 200, the one or more lens actuators 400 and 500, and the substrate 700 electrically connected to the image sensor module 600. The substrate 700 may be coupled to the housing 100 and electrically connected to the components of the camera module 10. For example, the substrate 700 may transmit and receive the electrical signal including a control signal to the coil 240 of the reflection module driving unit or each driving unit of the lens actuators 400 and 500.

Each of the lens actuators 400 and 500 included in the camera module 10 may receive electrical energy from the substrate 700, and may be moved in the optical axis direction (e.g., Z-axis direction), thereby performing the zoom function or the autofocus function.

Hereinafter, a configuration of each of the lens actuators 400 and 500 according to the various examples is described in detail with reference to FIGS. 3 through 6. The description describes the detailed configuration of one lens actuator 400 (in FIG. 3 for example) with reference to FIGS. 3 through 6. However, this detailed configuration of the lens actuator 400 shown in FIGS. 3 through 6 may be applied to each of the plurality of lens actuators 400 and 500 shown in FIG. 2. For example, the first lens actuator 400 and the second lens actuator 500, shown in FIG. 2 may each include a lens barrel 430 (in FIG. 3 for example) and the driving unit, shown in FIGS. 3 through 6.

FIG. 3 is an exploded perspective view of the lens actuator 400. The lens actuator 400 and the camera module, described with reference to FIG. 3, respectively correspond to the lens actuator 400 or 500 and the camera module 10, described above with reference to FIGS. 1 and 2, and redundant descriptions thereof are thus omitted.

The lens actuator 400 may include the lens barrel 430 accommodating the one or more lenses 433 and the driving unit connected to the lens barrel 430 and moving the lens barrel 430 based on the housing 100 in the optical axis direction (e.g., Z-axis direction).

The lens barrel 430 may include the one or more lenses 433. When the plurality of lenses is positioned in the one lens barrel 430, the plurality of lenses may be aligned in the lens barrel 430 in the optical axis direction.

The lens barrel 430 may be moved in the housing 100 in the optical axis direction (e.g., Z-axis direction). For example, as shown in FIG. 3, the lens barrel 430 may be positioned in the housing 100 and moved within a predetermined range in the optical axis direction (Z-axis direction).

One or more guide rails 111 and 112 each guiding the movement of the lens barrel 430 may be positioned in the housing 100. For example, the guide rails 111 and 112 may be extended from a bottom surface of the housing 100 in the optical axis direction (Z-axis direction). The one or more guide rails 111 and 112 may be positioned, and for example, as shown in FIG. 3, the plurality of guide rails 111 and 112 extended in the optical axis direction (Z-axis direction) may be positioned in parallel to each other by a predetermined distance in a width direction (e.g., the X-axis direction) of the housing 100.

The lens barrel 430 may be seated on the guide rails 111 and 112 and may be moved in the optical axis direction (Z-axis direction). That is, the guide rails 111 and 112 may serve to guide the lens barrel 430 to be moved along a predetermined path in the optical axis direction (Z-axis direction). In addition, as the guide rails 111 and 112 are positioned thereon, a contact area between the lens barrel 430 and the bottom surface of the housing 100 may be reduced, thereby reducing a friction force between the lens barrel 430 and the housing 100 when the lens barrel 430 is moved.

A guide groove 432 accommodating at least a portion of each of the guide rails 111 and 112 may be positioned in a portion of a bottom surface of the lens barrel 430, in which the lens barrel 430 and the guide rails 111 and 112 are in contact with each other. Accordingly, the lens barrel 430 may be moved in the optical axis direction (Z-axis direction) along the guide rails 111 and 112 while at least a portion of each of the guide rails 111 and 112 are accommodated in the guide groove 432. As the guide groove 432 is positioned therein, the lens barrel 430 may be stably slid without being separated from the guide rails 111 and 112 even when an impact is applied from the outside of the lens actuator 400.

A friction reduction member (not shown) which may reduce the friction force may be further positioned between the guide groove 432 of the lens barrel 430 and the guide rails 111 and 112 of the housing 100. For example, the friction reduction member (not shown) including at least one of a bush, a bearing, a roller and a ball member, made of a material which may reduce the friction force, may be positioned in the guide groove 432 of the lens barrel 430.

The driving unit may generate the driving force that moves the lens barrel 430 in the optical axis direction (Z-axis direction). The driving unit may include a driving wire 411 a length of which is changed and a driving transmission unit connected to the driving wire 411 and moving the lens barrel 430 using driving force generated from the driving wire 411.

The driving wire 411 may be made of a material a length of which is changed based on the control signal. For example, the driving wire 411 may be made of a shape memory alloy (SMA) material the length of which is changed when the current or the voltage is applied thereto. Both ends of the driving wire 411 may be electrically connected to the substrate 700 (in FIG. 2 for example), and may receive the current or the voltage from an external power source (not shown). That is, the driving wire 411 may be made of the conductive SMA material through which the current may flow, and one end and the other end of the driving wire 411 may respectively be connected to different portions of the substrate 700 in FIG. 2, to form a closed circuit leading to the power source (not shown). When the current or the voltage is applied to both ends of the driving wire 411 by the power source (not shown), an entire length of the driving wire 411 may be contracted or extended.

One end of the driving wire 411 may be fixed to the housing 100, and the other end thereof may be connected to the driving transmission unit. For example, as shown in FIG. 3, one end of the driving wire 411 may be coupled to a wire fixation member 412 and fixed to an inner surface of the housing 100. The other end of the driving wire 411 may be connected to a crank gear 414 included in the driving transmission unit. A wire connection member 413 binding the crank gear 414 and the driving wire 411 to each other may be positioned at a portion in which the crank gear 414 and the driving wire 411 are connected to each other. The wire fixation member 412 and the wire connection member 413 may each be formed of a conductive material through which the current may flow.

As the length of the driving wire 411 is changed, the other end of the driving wire 411, connected to the crank gear 414 may rotate the crank gear 414. For example, as shown in FIG. 3, the other end of the driving wire 411 may be fixed to the crank gear 414 by the wire connection member 413, and may rotate the crank gear 414 about a constant rotation axis (e.g., rotation axis formed by a crankshaft 415a) as the length of the driving wire 411 is contracted.

The one or more driving wires 411 may be included in the driving unit. For example, as shown in FIG. 3, the plurality of driving wires 411 may be included in the driving unit, and each of the driving wires 411 may be made of a material the length of which is changed based on the control signal. The plurality of driving wires 411 may each be coupled to a different portion of the crank gear 414, and accordingly, as the length of each driving wire 411 is changed, the crank gear 414 may be rotated in a different direction. For example, as shown in FIG. 3, the two driving wires 411 may be coupled to the crank gear 414 with a rotational shaft of the crank gear 414 (e.g., rotational shaft formed by the crankshaft 415a) interposed therebetween. Accordingly, the crank gear 414 may be rotated clockwise when any one of the driving wires 411 is contracted, and the crank gear 414 may perform a rotational motion counterclockwise when the other driving wire 411 is contracted. The rotational motion of the crank gear 414 based on the change in the length of the driving wire 411 is described below with reference to FIG. 4 or 6.

The driving transmission unit may convert a force generated as the length of the driving wire 411 is contracted or extended into the driving force that moves the lens barrel 430. The driving transmission unit may include the crank gear 414 connected to the driving wire 411, a pulley gear 421 connected to the crank gear 414, and a guide wire 423 connecting the pulley gear 421 and the lens barrel 430 to each other.

The crank gear 414 may be connected to the driving wire 411 and may be rotated about the constant rotation axis based on whether the driving wire 411 is contracted or extended. The rotation axis of crank gear 414 may be in a direction (e.g., X-axis direction) crossing the optical axis direction (Z-axis direction). The crank gear 414 may be supported on the inner wall of the housing 100 to be rotated by the crankshaft 415a. Therefore, the rotation axis of the crank gear 414 may be formed by the crankshaft 415a supporting the crank gear 414 to be rotatable. A crank fixation member 415b may be positioned at an end of the crankshaft 415a to prevent the crank gear 414 from being separated from the crankshaft 415a.

The pulley gear 421 may be connected to the crank gear 414 and may be rotated about the constant rotation axis based on the rotation of the crank gear 414. The rotation axis of the pulley gear 421 may be formed parallel to the rotation axis of the crank gear 414. The pulley gear 421 may be supported on the inner wall of the housing 100 to be rotated by a pulley shaft 425a. Therefore, the rotation axis of the pulley gear 421 may be formed by the pulley shaft 425a supporting the pulley gear 421 to be rotatable. A pulley fixation member 425b may be positioned at an end of the pulley shaft 425a to prevent the pulley gear 421 from being separated from the pulley shaft 425a. The guide wire 423 may be connected to the pulley gear 421. For example, as shown in FIG. 3, the pulley gear 421 may include a first wheel 421a connected to the crank gear 414 and a second wheel 421b connected to the guide wire 423. The first wheel 421a and the second wheel 421b may be integrally formed with each other and may be rotated together. Therefore, when the crank gear 414 rotates the first wheel 421a, the second wheel 421b may also be rotated together with the first wheel 421a.

A sub-pulley gear 422 may be positioned spaced apart from the pulley gear 421 in the optical axis direction (e.g., Z-axis direction), and may be supported on an inner surface of the housing 100 to be rotated by a sub-pulley shaft 427a. A rotation axis of the sub-pulley gear 422 may be formed parallel to the rotation axis of the pulley gear 421 (e.g., rotation axis formed by the pulley shaft 425a), and may be formed by the sub-pulley shaft 427a. A sub-pulley fixation member 427b may be positioned at an end of the sub-pulley shaft 427a to prevent the sub-pulley gear 422 from being separated from the sub-pulley shaft 427a during its rotation.

The guide wire 423 may be connected to at least a portion of the pulley gear 421, and may move the lens barrel 430 in the optical axis direction. The guide wire 423 may be connected to at least portions of the pulley gear 421 and the sub-pulley gear 422 by winding the same, and may be rotated between the pulley gear 421 and the sub-pulley gear 422 based on the rotation of the pulley gear 421. For example, as shown in FIG. 3, the guide wire 423 may have a shape of a belt connecting the pulley gear 421 and the sub-pulley gear 422 spaced apart from each other in the optical axis direction (Z-axis direction), and may be rotated between the pulley gear 421 and the sub-pulley gear 422 based on the rotation of the pulley gear 421.

The lens barrel 430 may be connected to at least a portion of the guide wire 423. For example, as shown in FIG. 3, the lens barrel 430 may be coupled to at least a portion of the guide wire 423 positioned between the pulley gear 421 and the sub-pulley gear 422. A fixation clip 431 into which the guide wire 423 may be inserted may be positioned on a side surface of the lens barrel 430 to stably fix the lens barrel 430 to the guide wire 423. The lens barrel 430 may be fixed to at least a portion of the guide wire 423, and may be moved in the optical axis direction (Z-axis direction) together with the guide wire 423 as the guide wire 423 is rotated between the pulley gear 421 and the sub-pulley gear 422.

The driving unit may further include a guide gear 424 positioned between the pulley gear 421 and the sub-pulley gear 422, and guiding at least a portion of the guide wire 423 to be rotated while maintaining its direction to be parallel to the optical axis direction. For example, as shown in FIG. 3, the guide gear 424 may be positioned between the pulley gear 421 and the sub-pulley gear 422. The guide gear 424 may be in contact with at least a portion of the guide wire 423 connected to the pulley gear 421, and may guide the guide wire 423 to be moved between the pulley gear 421 and the sub-pulley gear 422 while maintaining its direction to be parallel to the optical axis direction (Z-axis direction). At least a portion of the guide wire 423 to which the lens barrel 430 is connected may be moved in the direction parallel to the optical axis direction (Z-axis direction) by the guide of the guide gear 424, and the lens barrel 430 connected to the guide wire 423 may also be stably moved in the optical axis direction (Z-axis direction). The guide gear 424 may be supported to be rotated by a guide gear shaft 426a and may thus be positioned to be rotated about a rotation axis formed by the guide gear shaft 426a. A guide gear fixation member 426b may be positioned at an end of the guide gear shaft 426a to prevent the guide gear 424 from being separated from the guide gear shaft 426a.

The guide gear 424 may be positioned to be rotated about the axis parallel to the rotation axis of the pulley gear 421. For example, the rotation axes of the pulley gear 421, sub-pulley gear 422 and guide gear 424 included in the driving unit may be formed parallel to one another.

The driving unit of the lens actuator 400 may convert the force generated when the length of the driving wire 411 is contracted or extended (e.g., tension generated when the driving wire 411 is contracted) into the driving force that moves the lens barrel 430 using the driving transmission unit. Hereinafter, a configuration of the driving transmission unit is described in detail with reference to FIGS. 4A through 5.

Figure 4A:
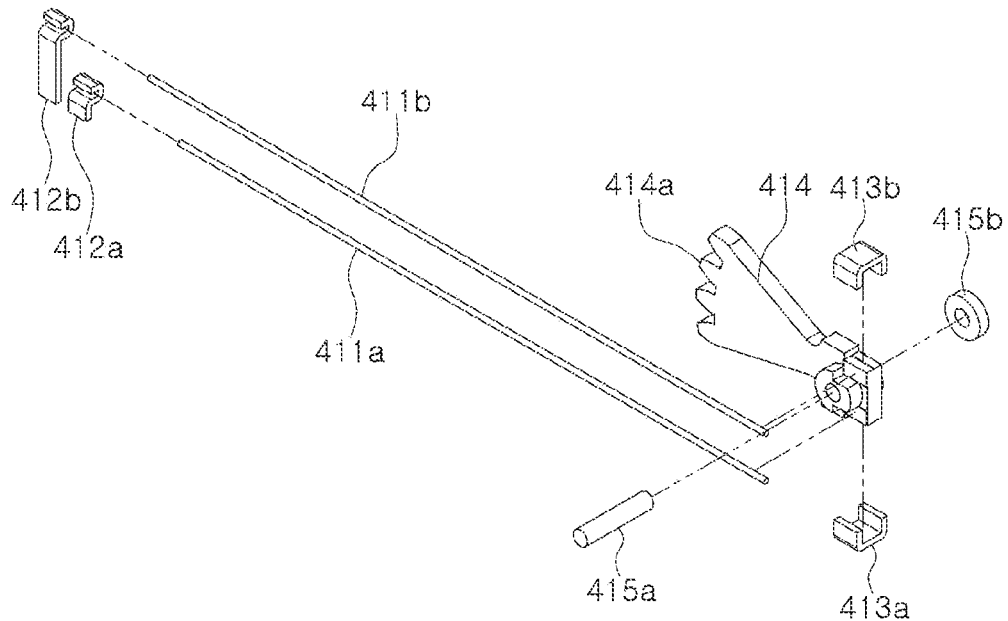
FIGS. 4A and 4B are exemplary views each showing that a driving wire and a crank gear are coupled to each other.
Figure 4B:
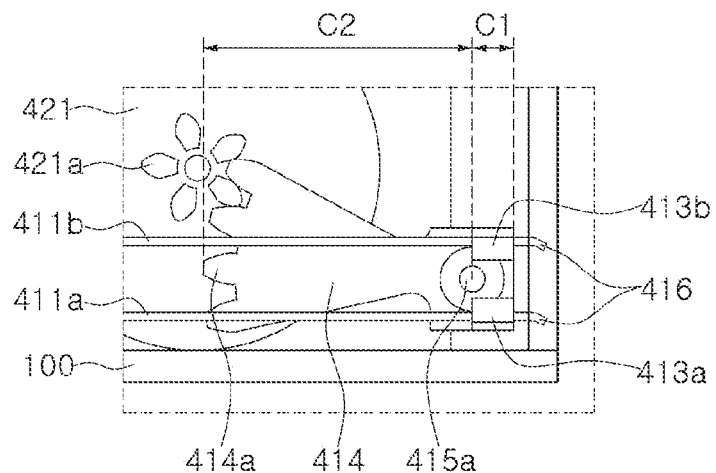

FIGS. 4A and 4B are views each showing that driving wires 411a and 411b and a crank gear 414, included in the lens actuator, are coupled to each other. The lens actuator, and the driving wires 411a and 411b and the crank gear 414, included therein, described with reference to FIGS. 4A and 4B respectively correspond to the lens actuators 400 and 500, and the driving wire 411 and the crank gear 414, included therein, described above with reference to FIGS. 2 and 3, and redundant descriptions thereof are thus omitted.

The lens actuator may include the driving wires 411a and 411b and the driving transmission unit connected to the driving wires 411a and 411b. The driving transmission unit may include the crank gear 414 in contact with and connected to the driving wires 411a and 411b, the pulley gear 421 connected to the crank gear 414, and the guide wire 423 (in FIG. 3 for example), connected to the pulley gear 421. FIGS. 4A and 4B each show that the crank gear 414 included in the driving transmission unit is connected to the driving wires 411a and 411b. The one or more driving wires 411a and 411b may be included in the driving unit, and may be the first driving wire 411a and the second driving wire 411b each connected to a different portion of the crank gear 414 for example, as shown in FIG. 4A.

The driving wires 411a and 411b may each be made of a material the length of which is changed. For example, at least one of the first driving wire 411a and the second driving wire 411b may include a shape memory alloy the length of which is changed when the current or the voltage is applied thereto.

One end of each of the driving wires 411a and 411b may be connected to wire fixation members 412a and 412b, and may be fixed to the housing. For example, as shown in FIG. 4A, the first driving wire 411a may be connected to the first wire fixation member 412a and fixed to the housing, and the second driving wire 411b may be connected to the second wire fixation member 412b and fixed to the housing. The wire fixation members 412a and 412b may each be made of the conductive material, and the driving wires 411a and 411b may be electrically connected to the substrate 700 in FIG. 2 through the wire fixation members 412a and 412b. The first wire fixation member 412a and the second wire fixation member 412b may be electrically separated from each other. Accordingly, the current or the voltage may be applied to only one of the first driving wire 411a and the second driving wire 411b. Alternatively, magnitude of the voltage or an amount of the current, applied to the first driving wire 411a and the second driving wire 411b may be configured to be different from each other. Alternatively, time intervals during which the voltage is applied to the first driving wire 411a and the second driving wire 411b may be configured to be different from each other.

The other end of each of the driving wires 411a and 411b may be connected to the crank gear 414. Wire connection members 413a and 413b, which respectively bind the crank gear 414 and the driving wires 411a and 411b to each other, may each be positioned at a portion where the crank gear 414 and the driving wires 411a and 411b are connected to each other. The wire connection members 413a and 413b may connect at least one of the first driving wire 411a and the second driving wire 411b to the crank gear 414. For example, as shown in FIG. 4A, the other end of each of the driving wires 411a and 411b may be in contact with and connected to the crank gear 414, and the wire connection members 413a and 413b may respectively wrap and secure the ends of the driving wires 411a and 411b and crank gear 414. The wire connection members 413a and 413b may be made of the conductive material through which the current may flow. The other end of each of the driving wires 411a and 411b may be electrically connected to the substrate 700 in FIG. 2 through a wire 416. The wire may be in direct contact with and connected to the other end of each of the driving wires 411a and 411b, or may be connected to the wire connection members 413a and 413b respectively wrapping the driving wires 411a and 411b. As one end and the other end of each of the driving wires 411a and 411b are electrically connected to the substrate 700 in FIG. 2, respectively, a closed circuit may be formed from the power source through the driving wires 411a and 411b, and the current or the voltage may thus be applied to the driving wires 411a and 411b.

The crank gear 414 may be connected to the driving wires 411a and 411b and may be positioned to be rotated about the constant rotation axis. For example, as shown in FIG. 4A, the crank gear 414 may be supported to be rotated by the crankshaft 415a, and may thus be rotated about the rotation axis formed by the crankshaft 415a. The crank fixation member 415b that binds the crankshaft 415a and crank gear 414 to each other may be positioned at the end of the crankshaft 415a to prevent the crank gear 414 from being separated from the crankshaft 415a.

One end of the crank gear 414 may be connected to the driving wires 411a and 411b. In the following description, the one end of the crank gear 414 connected to the driving wires 411a and 411b is defined as a first connection portion. For example, as shown in FIG. 4A, the first driving wire 411a and the second driving wire 411b may be connected to the first connection portion of the crank gear 414. Therefore, as each length of the driving wires 411a and 411b is changed, the ends of the driving wires 411a and 411b may each be moved in a direction in which each length of the driving wires 411a and 411b is changed. In this case, the first connection portion of the crank gear 414 connected to the ends of the driving wires 411a and 411b may also be moved in the direction in which each length of the driving wires 411a and 411b is changed, and as the first connection portion of the crank gear 414 is moved, the crank gear 414 may be rotated about the crankshaft 415a. That is, as each length of the driving wires 411a and 411b is changed, the crank gear 414 connected to the driving wires 411a and 411b may be rotated about the crankshaft 415a.

The first driving wire 411a and the second driving wire 411b may be connected to the crank gear 414 with the crankshaft 415a therebetween. Therefore, a direction in which the crankshaft 415a is rotated as the first driving wire 411a is contracted and a direction in which the crankshaft 415a is rotated as the second driving wire 411b is contracted may be opposite to each other. For example, as shown in FIGS. 4A and 4B, the first driving wire 411a and the second driving wire 411b may be aligned parallel to each other with the crankshaft 415a therebetween to be connected to the first connection portion of the crank gear 414. Accordingly, the crank gear 414 may be rotated in a first direction when the first driving wire 411a positioned above the crankshaft 415a is contracted, and the crank gear 414 may be rotated in a second direction opposite to the first direction when the second driving wire 411b positioned below the crankshaft 415a is contracted. That is, the contraction of the first driving wire 411a and the contraction of the second driving wire 411b may generate a torque in the crank gear 414 in different directions. Therefore, the crank gear 414 may be rotated in a desired direction by selectively contracting either the first driving wire 411a or the second driving wire 411b.

The other end of the crank gear 414 may mesh with the pulley gear 421 and rotate the pulley gear 421. In the following description, the other end of the crank gear 414 meshing with the pulley gear 421 is defined as a second connection portion 414a. The second connection portion 414a and first connection portion of the crank gear 414 may be integrally formed with each other. Accordingly, when the first connection portion of the crank gear 414 is rotated about the crankshaft 415a, the second connection portion 414a may be rotated together. That is, as the driving wires 411a and 411b are contracted, the first connection portion and second connection portion 414a of the crank gear 414 may be rotated in the same direction about the crankshaft 415a, and the pulley gear 421 meshing with the second connection portion 414a of the crank gear 414 may also be rotated.

The second connection portion 414a of the crank gear 414 may be positioned to mesh with the first wheel 421a of the pulley gear 421, and a friction member (not shown) or a fastening structure may be further formed on a surface on which the two components mesh with each other to increase friction force therebetween. For example, as shown in FIGS. 4A and 4B, teeth may be formed on the second connection portion 414a of the crank gear 414. Accordingly, teeth having a shape corresponding to a shape of the teeth of the second connection portion 414a may be also formed on the first wheel 421a of the pulley gear 421 meshing with the second connection portion 414a. Therefore, the second connection portion 414a of the crank gear 414 and the first wheel 421a of the pulley gear 421 may be rotated together while having their teeth coupled to each other. However, the shape of the teeth shown in FIGS. 4A and 4B is only an example, and the teeth may have various specific shapes. A friction member (not shown) capable of increasing frictional force may be positioned on at least one of an outer ring of the second connection portion 414a of the crank gear 414 and an outer ring of the first wheel 421a of the pulley gear 421.

A distance from the crankshaft 415a to the first connection portion of the crank gear 414 may be different from a distance from the crankshaft 415a to the second connection portion 414a. For example, it may be assumed that the distance from the crankshaft 415a to the first connection portion is referred to as a first distance C1, and the distance from the crankshaft 415a to the second connection portion 414a is referred to as a second distance C2. In this case, as shown in FIG. 4B, the first distance C1 may be shorter than the second distance C2. When the second distance C2 is longer than the first distance C1, a distance in which the second connection portion 414a is moved as the crank gear 414 is rotated may be longer than a distance in which the first connection portion is moved. That is, even when the first connection portion to which the driving wires 411a and 411b are connected is moved by an amount of the changes in the lengths of the driving wires 411a and 411b, the second connection portion 414a may be moved more than the amount of the changes in the lengths of the driving wires 411a and 411b. Accordingly, a rotation amount (or a length of a rotation trajectory) of the pulley gear 421 meshing with the second connection portion 414a may also be increased. That is, as the first distance C1 and second distance C2 of the crank gear 414 are different from each other, each rotation amount of the crank gear 414 and the pulley gear 421 may be relatively large even when the amount of the changes in the lengths of the driving wires 411a and 411b is relatively small.

Hereinafter, the description describes that the pulley gear 421 included in the driving transmission unit according to the exemplary embodiments is connected to the lens barrel 430 with reference to FIG. 5.

Figure 5:
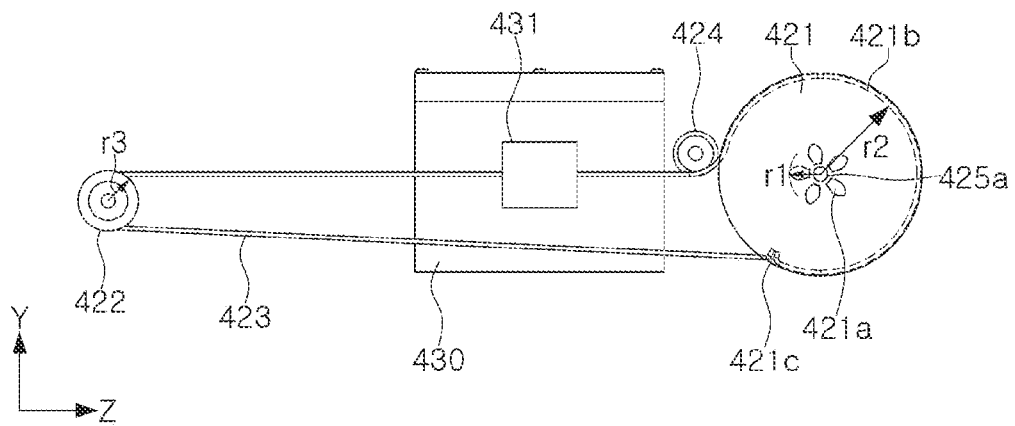
FIG. 5 is a view showing that a portion of a driving transmission unit and a lens barrel are coupled to each other.

FIG. 5 is a view showing that a portion of the driving transmission unit and the lens barrel 430 are coupled to each other. The lens actuator and the driving transmission unit, described with reference to FIG. 5, respectively correspond to the lens actuators 400 and 500 and the driving transmission unit, described above with reference to FIGS. 1 through 4B, and redundant descriptions thereof are thus omitted.

The lens actuators 400 (in FIG. 3 for example) may each include the lens barrel 430 and the driving transmission unit moving the lens barrel 430. The driving transmission unit may include the crank gear 414 rotated by being connected to the driving wires 411a and 411b, the pulley gear 421 rotated while meshing with the crank gear 414 and the guide wire 423 rotated by being wound around at least a portion of an outer circumferential surface of the pulley gear 421 as the pulley gear 421 is rotated. The lens barrel 430 may be fixed to the guide wire 423, and accordingly, as the guide wire 423 is moved, the lens barrel 430 may also be moved in a direction in which the guide wire 423 is moved.

The pulley gear 421 may be a disk-shaped gear member including the first wheel 421a meshing with the crank gear 414 and the second wheel 421b to which the guide wire 423 is connected. The first wheel 421a and the second wheel 421b may be integrally formed with each other, and the first wheel 421a and the second wheel 421b may thus have the same rotation angle.

The second connection portion 414a (in FIG. 4B) of the crank gear 414 (in FIG. 4B) may be connected to the first wheel 421a of the pulley gear 421, and a detailed description thereof is made with reference to FIGS. 4A and 4B.

The guide wire 423 may be connected to at least a portion of an outer circumferential surface of the second wheel 421b of the pulley gear 421. Therefore, as the pulley gear 421 is rotated, the guide wire 423 may also be rotated. The guide wire 423 may be connected to both the pulley gear 421 and the sub-pulley gear 422 positioned spaced apart from the pulley gear 421 in the optical axis direction (e.g., Z-axis direction). For example, as shown in FIG. 5, the guide wire 423 may have the shape of a belt or chain connecting the pulley gear 421 and the sub-pulley gear 422 to each other. Accordingly, when the pulley gear 421 is rotated, the guide wire 423 and the sub-pulley gear 422 may also be rotated. The guide wire 423 may be made of a flexible material to wrap the pulley gear 421 and the sub-pulley gear 422. Alternatively, the guide wire 423 may be made of a material which may not be stretched even when an external force is applied thereto to stably connect the pulley gear 421 and the sub-pulley gear 422 with each other.

A fixation groove 421c to which at least a portion of the guide wire 423 is fixed may be positioned in the outer circumferential surface of the pulley gear 421. For example, as shown in FIG. 5, the fixation groove 421c in which a portion of the guide wire 423 is inserted and fixed may be positioned in the outer circumferential surface of the second wheel 421b of the pulley gear 421. As at least a portion of the guide wire 423 is fixed in the fixation groove 421c, the guide wire 423 may be rotated together with the pulley gear 421 on the outer circumferential surface of the pulley gear 421 without spinning.

The guide gear 424 may be positioned between the pulley gear 421 and the sub-pulley gear 422 for at least a portion of the guide wire 423 to be moved in the optical axis direction (e.g., Z-axis direction). The guide gear 424 may be in contact with at least a portion of the guide wire 423 to guide the guide wire 423 to be moved in the optical axis direction (e.g., Z-axis direction). For example, as shown in FIG. 5, the guide gear 424 may be positioned between the pulley gear 421 and the sub-pulley gear 422, and the guide gear 424 may be in contact with the guide wire 423 to guide the guide wire 423 to be extended in the optical axis direction (e.g., Z-axis direction).

A radius r3 of the sub-pulley gear 422 may be smaller than a radius r2 of the second wheel 421b of the pulley gear 421. Accordingly, it is possible to allow the pulley gear 421 and the sub-pulley gear 422 to be spaced apart from each other as much as possible while maintaining an overall length of the guide wire 423, and to secure a maximum distance in which the lens barrel 430 may be moved between the pulley gear 421 and the sub-pulley gear 422.

The lens barrel 430 may be fixedly coupled to a portion of the guide wire 423, where the guide wire 423 is extended in the optical axis direction (e.g., Z-axis direction). For example, as shown in FIG. 5, the lens barrel 430 may be fixed to a portion of the guide wire 423 extended between the guide gear 424 and the sub-pulley gear 422. The fixation clip 431 may engage the lens barrel 430 and the guide wire 423 to each other to fix the lens barrel 430 to the guide wire 423. Accordingly, the lens barrel 430 fixed to at least a portion of the guide wire 423 may be moved in the optical axis direction (e.g., Z-axis direction) together with the guide wire 423 as the pulley gear 421 is rotated.

A radius r1 of the first wheel 421a of the pulley gear 421 may be smaller than the radius r2 of the second wheel 421b. That is, an outer diameter of the first wheel 421a of the pulley gear 421 may be smaller than an outer diameter of the second wheel 421b. Accordingly, while the first wheel 421a and the second wheel 421b are rotated at the same rotation angle in the pulley gear 421, a length of an arc formed by a point on the outer circumferential surface of the second wheel 421b may be longer than a length of an arc formed by a point on an outer circumferential surface of the first wheel 421a. A length of a rotational trajectory of the first wheel 421a may correspond to a length of a rotational trajectory of the crank gear 414 (in FIG. 4B) rotated while meshing with the first wheel 421a, and a length of a rotation trajectory of the second wheel 421b may thus be longer than the length of the rotation trajectory of the crank gear 414 (in FIG. 4B). That is, the first wheel 421a and second wheel 421b of the pulley gear 421 may have outer diameters designed different from each other, and a distance in which the guide wire 423 connected to the second wheel 421b is moved may thus be greater than the length of the rotation trajectory of the crank gear 414 (in FIG. 4B). Accordingly, a distance in which the lens barrel 430 is moved by being connected to the guide wire 423 may be greater than the length of the rotation trajectory of the crank gear 414 (in FIG. 4B).

The first distance C1 (in FIG. 4B) and second distance C2 (in FIG. 4B) of the crank gear 414 (in FIG. 4B) may be different from each other, thereby making the length of the rotation trajectory of the second connection portion 414a (in FIG. 4B) of the crank gear 414 (in FIG. 4B) longer than the amount of the changes in the lengths of the driving wires 411a and 411b (in FIG. 4B), which is described above with reference to FIGS. 4A and 4B.

As a result, in the driving transmission unit including the crank gear 414 and the pulley gear 421, the driving force generated by the length changes of the driving wires 411a and 411b may be transmitted to the lens barrel 430 through the crank gear 414 having the first distance C1 (in FIG. 4B) and the second distance C2 (in FIG. 4B) different from each other, and the pulley gear 421 having the outer diameter of the first wheel 421a and the outer diameter of the second wheel 421b, different from each other, thereby making the distance in which the lens barrel 430 is moved greater than the amount of the changes in the lengths of the driving wires 411a and 411b.

Hereinafter, the description describes that each of the lens actuators 400 and 500 (in FIG. 2 for example), according to the various examples is driven with reference to FIGS. 6A through 6D.

FIGS. 6A, 6B, 6C, and 6D are all side views each showing the lens actuator 400 or 500 (in FIG. 2) positioned in the camera module 10 (in FIG. 2 for example). The lens actuator 400 or 500 (in FIG. 2) and the camera module 10 (in FIG. 2), described with reference to FIGS. 6A through 6D respectively correspond to the lens actuator 400 or 500 (in FIG. 2) and the camera module 10 (in FIG. 2), described above with reference to FIGS. 1 through 5, and redundant descriptions thereof are thus omitted.

The lens actuators 400 and 500 (in FIG. 2) may each include the lens barrel 430 which may be moved in the optical axis direction (e.g., Z-axis direction), the driving wires 411a and 411b each generating the driving force to move the lens barrel 430, and the driving transmission unit transmitting the driving force generated by the driving wires 411a and 411b to the lens barrel 430. The driving transmission unit may include the crank gear 414 rotated by being connected to the driving wires 411a and 411b, the pulley gear 421 rotated by being connected with the crank gear 414, and the guide wire 423 connected to the pulley gear 421 and the lens barrel 430 to move the lens barrel 430 as the pulley gear 421 is rotated.

Figure 6A:
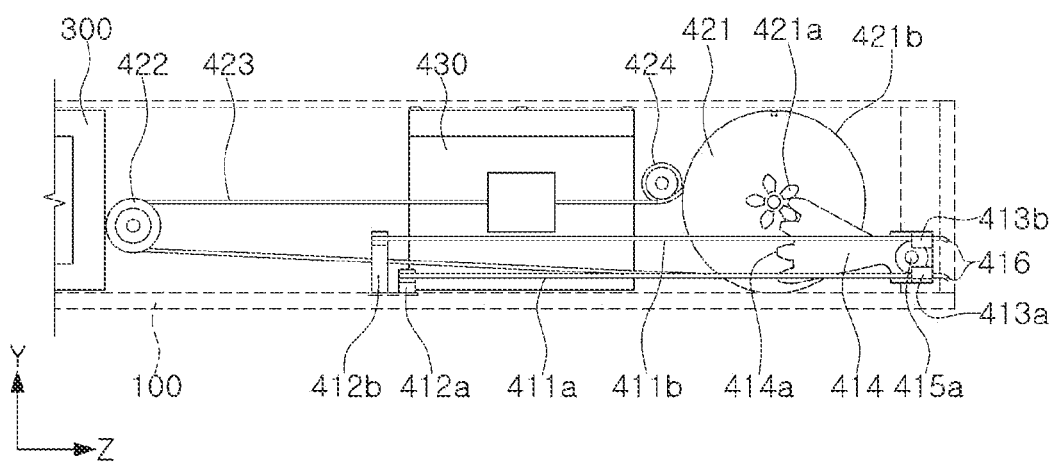
FIGS. 6A, 6B, 6C, and 6D are side views each showing a lens actuator positioned in the camera module.

In each of the lens actuators 400 and 500 (in FIG. 2), at least each portion of the driving wires 411a and 411b may be extended in the optical axis direction (e.g., Z-axis direction). The one or more driving wires 411a and 411b may be included in the driving unit. When the plurality of driving wires 411a and 411b are included in the driving unit, at least a portion of each of the one or more driving wires 411a and 411b may be extended in the optical axis direction (e.g., Z-axis direction). For example, as shown in FIG. 6A, at least a portion of each of the first driving wire 411a and the second driving wire 411b, connected to the crank gear 414, may be extended in the optical axis direction (e.g., Z-axis direction).

The first driving wire 411a and the second driving wire 411b may be disposed opposite to each other in the direction crossing the optical axis direction (e.g., Z-axis direction). For example, as shown in FIG. 6A, the first driving wire 411a and the second driving wire 411b may be disposed in parallel to be opposite to each other in the direction (e.g., Y-axis direction) crossing the optical axis direction (e.g., Z-axis direction).

The driving wires 411a and 411b may each be made of a shape memory alloy the length or shape of which is changed as the voltage or the current is applied thereto. One end of each of the driving wires 411a and 411b may be electrically connected to the substrate 700 (in FIG. 2 for example) by the wire fixation members 412a and 412b, and the other end of each of the driving wires 411a and 411b may be electrically connected to the substrate 700 (in FIG. 2) through the wire 416. One end and the other end of each of the driving wires 411a and 411b may be electrically connected to the substrate 700 (in FIG. 2), respectively. Therefore, when applying a predetermined voltage between one end and the other end of each of the driving wires 411a and 411b, the current may flow in the driving wires 411a and 411b, thereby contracting or extending the driving wires 411a and 411b. For example, when the voltage is applied to both the ends of each of the driving wires 411a and 411b, at least a portion of each of the driving wires 411a and 411b may be contracted in the optical axis direction to have a reduced length, and as each length of the driving wires 411a and 411b is reduced, the tension may be generated in each of the driving wires 411a and 411b.

The force generated as the length of each of the driving wires 411a and 411b is changed may be transmitted to the lens barrel 430 through the driving transmission unit. The driving transmission unit may include the crank gear 414 connected to the driving wires 411a and 411b, the pulley gear 421 connected to the crank gear 414, and the guide wire 423 connected to the pulley gear 421, and the lens barrel 430 may be connected to the guide wire 423 and may be moved along the guide wire 423 in the optical axis direction (e.g., Z-axis direction). A detailed structure in which the driving wires 411a and 411b and the crank gear 414 are connected to each other is described above with reference to FIGS. 4A and 4B, and a detailed structure in which the pulley gear 421 and the lens barrel 430 are connected to each other is described above with reference to FIG. 5.

Hereinafter, the description describes an operation of the driving unit based on the length changes of the driving wires 411a and 411b.

Figure 6B:
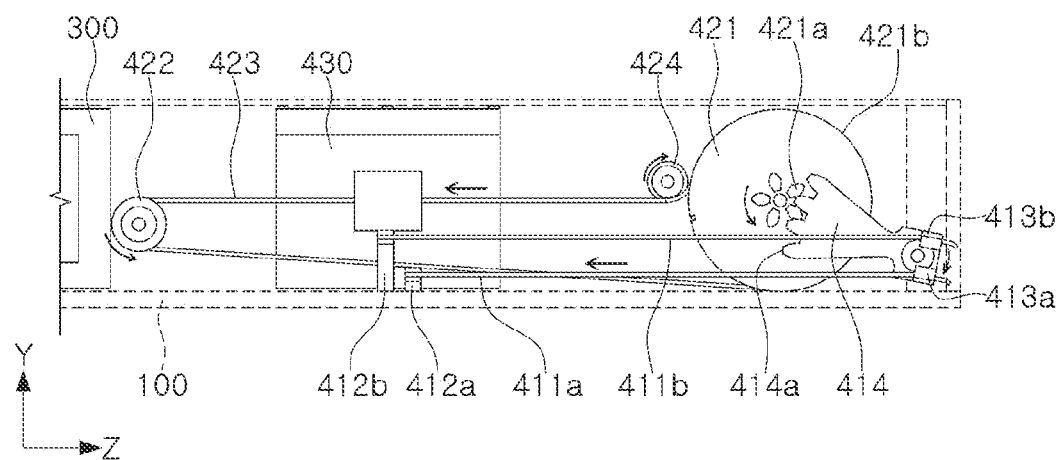
Figure 6C:
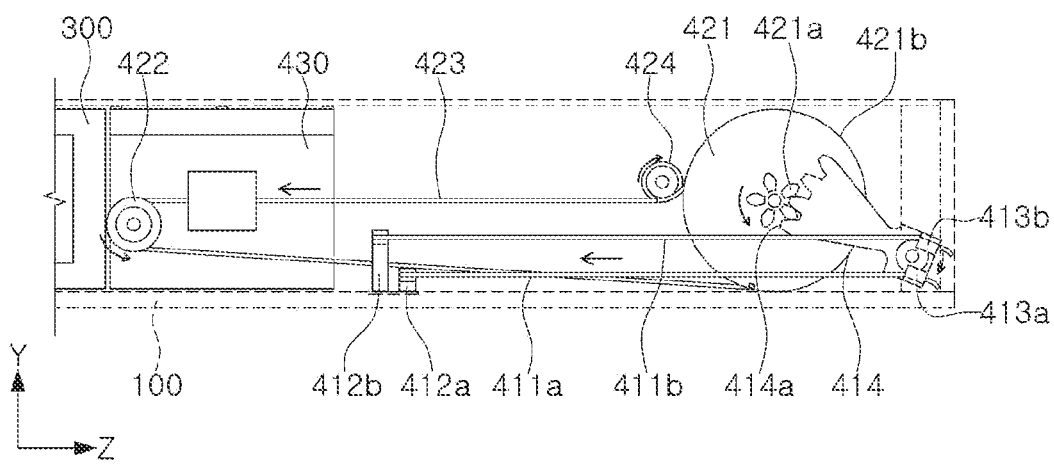
Figure 6D:
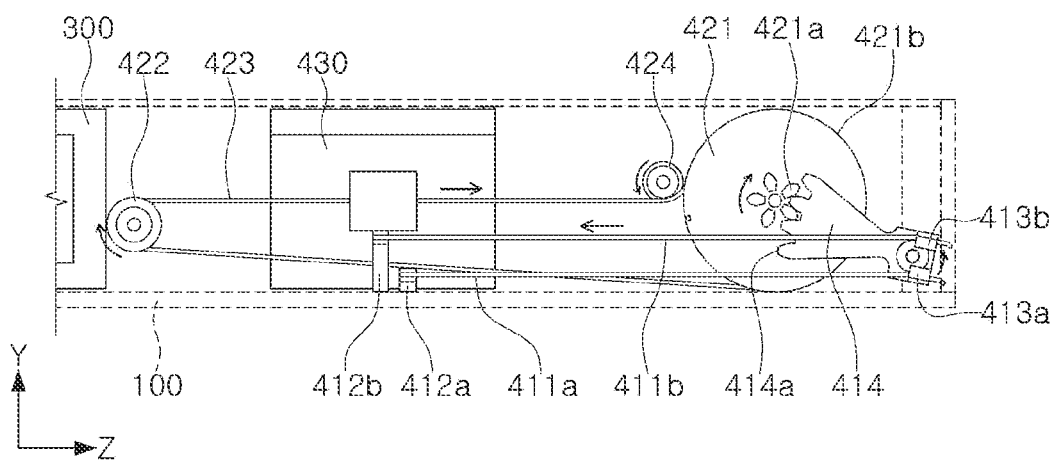

FIGS. 6B through 6D are exemplary views showing that the lens barrel 430 is moved in the optical axis direction (e.g., Z-axis direction) as the driving wires 411a and 411b are contracted. FIGS. 6B and 6C each show that the lens barrel 430 is moved in one direction on an optical axis as the first driving wire 411a is contracted, and FIG. 6D shows that the lens barrel 430 is moved in a direction opposite to the direction shown in FIG. 6C as the second driving wire 411b is contracted. As shown in FIGS. 6B through 6D, the lens barrel 430 may be moved in the optical axis direction (e.g., Z-axis direction) by contracting at least one of the first driving wire 411a and the second driving wire 411b.

First, the description describes that each of the lens actuators 400 and 500 (in FIG. 2) is driven with reference to FIGS. 6B and 6C.

The first driving wire 411a may be made of the shape memory alloy the length of which is contracted when the current or the voltage is applied thereto. When the current or the voltage is applied to the first driving wire 411a to contract the first driving wire 411a, the end of the first driving wire 411a, connected to the crank gear 414 may be moved in a direction in which the first driving wire 411a is contracted. As the end of the first driving wire 411a is moved, the crank gear 414 connected to the first driving wire 411a may be rotated about the rotation axis formed by the crankshaft 415a. For example, as shown in FIG. 6B, when the first driving wire 411a is connected to crank gear 414 below the crankshaft 415a, the force contracting the first driving wire 411a may generate the torque in the crank gear 414 in a clockwise direction. Therefore, the force contracting the first driving wire 411a may cause the crank gear 414 to be rotated about the crankshaft 415a in the clockwise direction.

As the crank gear 414 is rotated, the pulley gear 421 connected to the crank gear 414 may also be rotated. For example, as shown in FIG. 6B, the second connection portion 414a of the crank gear 414 and the first wheel 421a of the pulley gear 421 may mesh with each other while having their teeth coupled to each other, and as the crank gear 414 is rotated in the clockwise direction, the pulley gear 421 may also be rotated in a counterclockwise direction. That is, as the crank gear 414 is rotated, the pulley gear 421 may be rotated in a direction opposite to the direction in which the crank gear 414 is rotated.

As the pulley gear 421 is rotated, the guide wire 423 connected to the second wheel 421b of the pulley gear 421 may also be rotated. For example, as shown in FIG. 6B, the guide wire 423 may have a shape of a ring connected to the pulley gear 421 and the sub-pulley gear 422, positioned spaced apart from each other in the optical axis direction (e.g., Z-axis direction), and as the pulley gear 421 is rotated in the counterclockwise direction, the guide wire 423 may perform a circular motion between the pulley gear 421 and the sub-pulley gear 422 in the counterclockwise direction. For the guide wire 423 to smoothly perform the circular motion, the sub-pulley gear 422 may be rotated in the same direction as a direction in which the guide wire 423 performs the circular motion. The guide gear 424 may be positioned between the pulley gear 421 and the sub-pulley gear 422 for at least a portion of the guide wire 423 may be moved in the direction parallel to the optical axis direction (e.g., Z-axis direction). The guide gear 424 may be in contact with the guide wire 423 performing the circular motion to guide at least a portion of the guide wire 423 to be moved in the optical axis direction (e.g., Z-axis direction).

The guide wire 423 may be moved as the pulley gear 421 is rotated, and the lens barrel 430 fixedly connected to the guide wire 423 may thus be moved together with the guide wire 423. For example, as shown in FIG. 6B, the lens barrel 430 may be fixed to at least a portion of the guide wire 423 and moved in the optical axis direction (e.g., Z-axis direction) as the guide wire 423 performs the circular motion.

The driving unit may adjust the distance in which the lens barrel 430 is moved by adjusting the amount of the changes in the lengths of the driving wires 411a and 411b. For example, it is possible to adjust the amount of the change in the length of the first driving wire 411a by adjusting the magnitude of the voltage or current applied to the driving wires 411a and 411b or adjusting time in which the same is applied thereto. It is thus possible to adjust the rotation amounts of the crank gear 414, pulley gear 421 and guide wire 423 of the driving transmission unit connected to the driving wires 411a and 411b, thereby adjusting the distance in which the lens barrel 430 is moved. That is, as shown in FIGS. 6B and 6C, it is possible to increase the rotation amounts of the crank gear 414 and the pulley gear 421 by gradually contracting the first driving wire 411a, thereby moving the lens barrel 430 closer to the fixed lens unit 300.

Each length of the driving wires 411a and 411b may be continuously changed. The driving transmission unit connected to the driving wires 411a and 411b may thus continuously move the lens barrel 430 in the optical axis direction (e.g., Z-axis direction) in response to the continuous length changes of the driving wires 411a and 411b.

The driving unit may include the second driving wire 411b positioned at a position different from that of the first driving wire 411a, and the second driving wire 411b may be made of the shape memory alloy the length of which is contracted when the current or the voltage is applied thereto. As shown in FIG. 6D, when the second driving wire 411b is contracted as the current or the voltage is applied thereto, the end of the second driving wire 411b, connected to the crank gear 414 may be moved in the direction in which the second driving wire 411b is contracted. As the end of the second driving wire 411b is moved, the crank gear 414 connected to the second driving wire 411b may be rotated about the rotation axis formed by the crankshaft 415a. As the crank gear 414 is rotated, the pulley gear 421 and the guide wire 423 connected to the pulley gear 421 may be rotated, and as a result, the lens barrel 430 may be moved in the optical axis direction (e.g., Z-axis direction).

The driving unit may be positioned for the two directions to be opposite to each other, the direction in which the lens barrel 430 is moved as the second driving wire 411b is contracted and the direction in which the lens barrel 430 is moved as the first driving wire 411a is contracted. For example, as shown in FIGS. 6C and 6D, the first driving wire 411a and the second driving wire 411b may be connected to the crank gear 414 with the crankshaft 415a interposed therebetween. Accordingly, the force contracting the first driving wire 411a and the force contracting the second driving wire 411b may generate the torque in opposite directions based on the rotation axis of the crank gear 414 (rotation axis formed by the crankshaft 415a for example). Accordingly, the two directions may be opposite to each other, the direction in which the crank gear 414, the pulley gear 421 and the guide wire 423 are rotated as the first driving wire 411a is contracted and the direction in which the crank gear 414, the pulley gear 421 and the guide wire 423 are rotated as the second driving wire 411b is contracted. That is, the force contracting the first driving wire 411a and the force contracting the second driving wire 411b may act on the lens barrel 430 through the driving transmission unit in the opposite directions, thereby moving the lens barrel 430 in the opposite directions. For example, as shown in FIG. 6C, as the first driving wire 411a is contracted, the lens barrel 430 may be moved closer to the fixed lens unit 300. To the contrary, as shown in FIG. 6D, as the length of the second driving wire 411b is contracted, the lens barrel 430 may be moved away from the fixed lens unit 300. That is, each of the lens actuators 400 and 500 (in FIG. 2) may selectively contract any one of the first driving wire 411a and the second driving wire 411b to move the lens barrel 430 in either direction of the optical axis.

The camera module 10 according to the various examples may include the plurality of lens actuators 400 and 500. Hereinafter, the description describes the camera module 10 including the plurality of lens actuators 400 and 500 with reference to FIGS. 7 through 8B.

Figure 7:
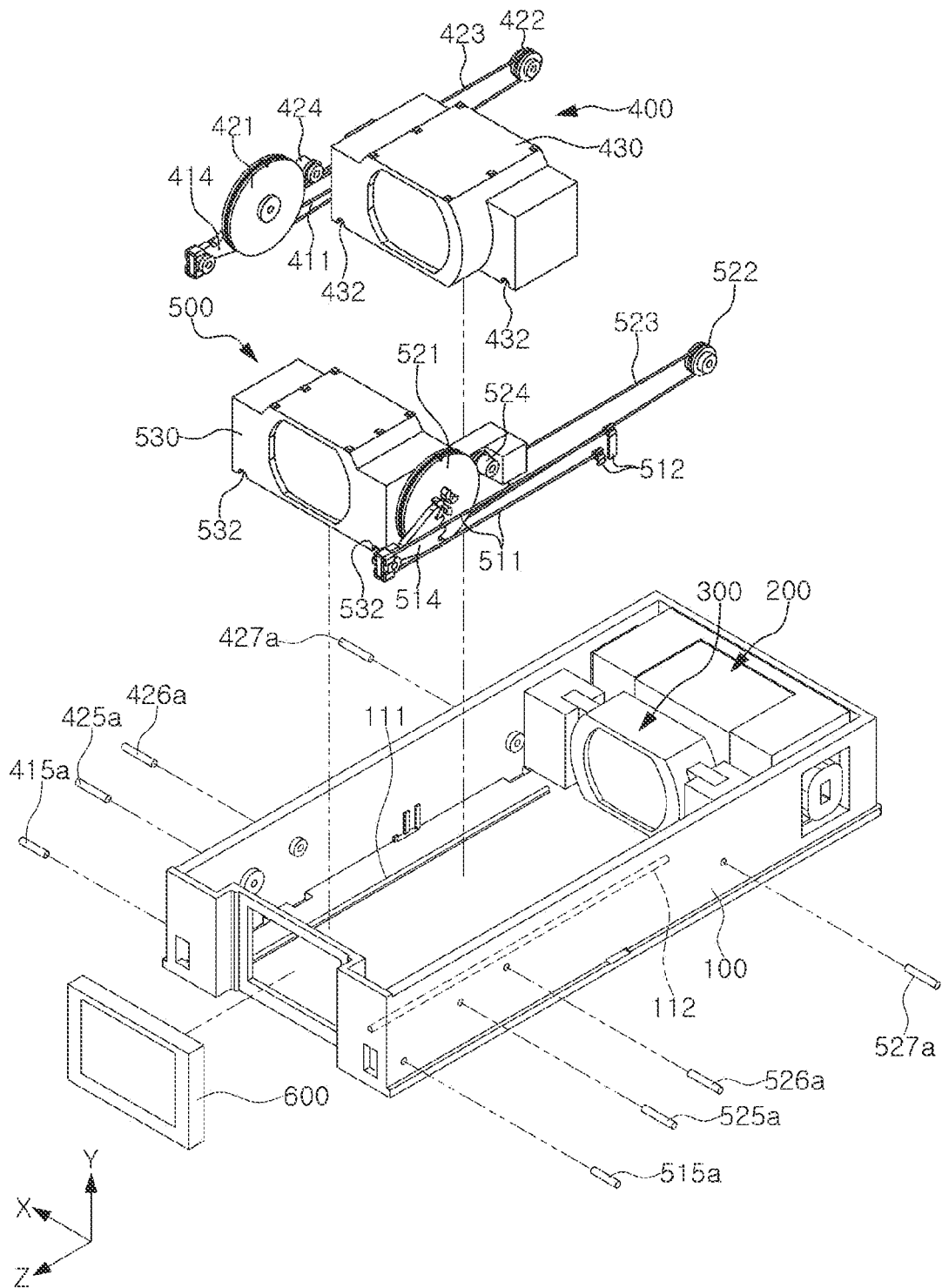
FIG. 7 is an exemplary view showing that the plurality of lens actuators positioned in the camera module are coupled to each other.
Figure 8A:
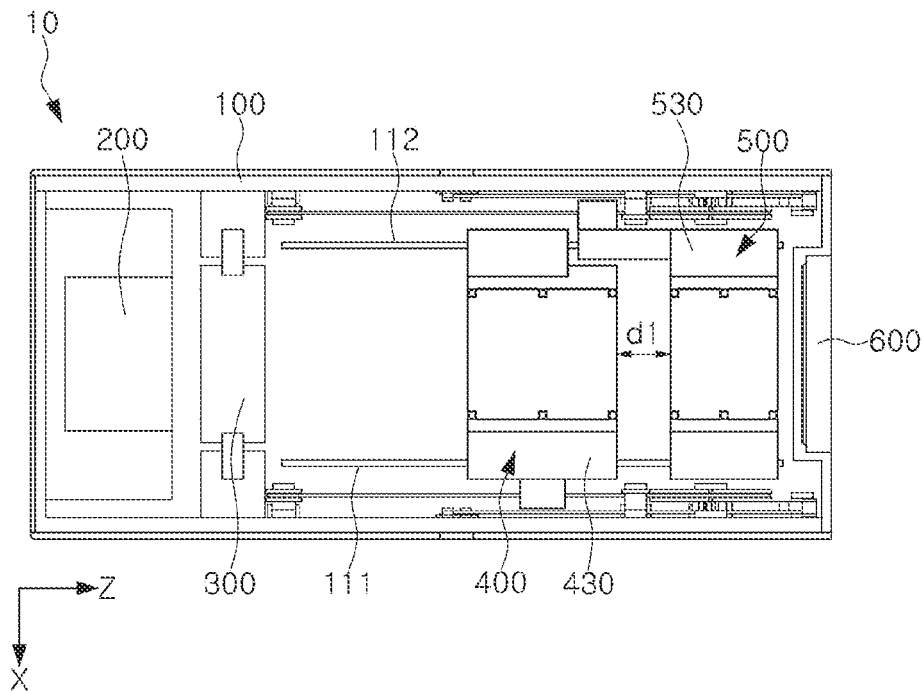
FIGS. 8A and 8B are top views each showing that an upper cover is omitted from the camera module.
Figure 8B:
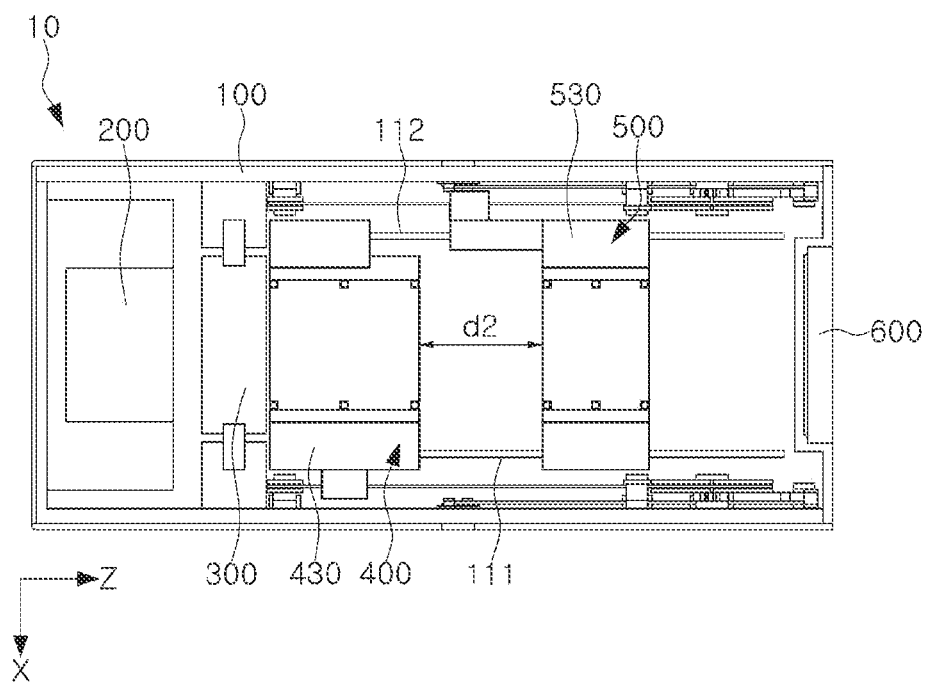

FIG. 7 is a view showing that the plurality of lens actuators 400 and 500, positioned in the camera module 10, are coupled to each other; and FIGS. 8A and 8B are top views each showing that an upper cover 800 (in FIG. 2 for example) is omitted from the camera module 10.

At least one of the plurality of lens actuators 400 and 500, included in the camera module 10 described with reference to FIGS. 7 through 8B may correspond to the lens actuator 400 described with reference to FIGS. 3 through 6D. For example, the camera module 10 according to the example of FIG. 7 may be the camera module 10 including the same two lens actuators as the lens actuator 400 described with reference to FIGS. 3 through 6D. However, the camera module 10 shown in FIGS. 7 through 8B is only an example. The camera module 10 may include various numbers of the lens actuators, or may further include a lens actuator having a structure different from that of the lens actuator 400 described with reference to FIGS. 3 through 6D.

For convenience of explanation, it may be assumed that all lens actuators described in the following description correspond to the lens actuator 400 described with reference to FIGS. 3 through 6D. Accordingly, omitted is a description overlapping that of the lens actuator described with reference to FIGS. 3 through 6D.

The camera module 10 may include the reflection module 200, the plurality of lens actuators 400 and 500, and an image sensor module 600. The plurality of lens actuators 400 and 500 may be the first lens actuator 400 and the second lens actuator 500. For example, as shown in FIG. 7, the first lens actuator 400 and the second lens actuator 500 may be accommodated between the reflection module 200 and the image sensor module 600, in the housing 100 of the camera module 10. The fixed lens unit 300 may be positioned between the reflection module 200 and the first lens actuator 400, and the incident light directed from the reflection module 200 to the plurality of lens actuators 400 and 500 may thus be refracted in the fixed lens unit 300. The housing 100, the reflection module 200, the fixed lens unit 300 and the image sensor module 600 may all correspond to the housing 100, the reflection module 200, the fixed lens unit 300 and the image sensor module 600 of the camera module 10 described with reference to FIG. 2, respectively, and descriptions thereof are made above with reference to FIG. 2.

The first lens actuator 400 may include the lens barrel 430 accommodating one or more lenses 433 (in FIG. 3 for example) and moved in the optical axis direction (e.g., Z-axis direction), and the driving unit moving the lens barrel 430. The driving unit of the first lens actuator 400 may include the driving wire 411 the length of which is changed when the voltage or the current is applied thereto, the crank gear 414 rotated in series by being connected to the driving wire 411, the pulley gear 421, the sub-pulley gear 422, the guide gear 424 and the guide wire 423. The crank gear 414, the pulley gear 421, the sub-pulley gear 422 and the guide gear 424 may respectively be supported by the crankshaft 415a, the pulley shaft 425a, the sub-pulley shaft 426a and the guide gear shaft 427a to be rotated on the inner surface of the housing 100. The lens barrel 430 and the driving unit, included in the first lens actuator 400, correspond to the lens barrel 430 and driving unit of the lens actuator 400, described with reference to FIGS. 3 through 6D, and redundant descriptions thereof are thus omitted.

The second lens actuator 500 may include a lens barrel 530 accommodating one or more lenses and moved in the optical axis direction (e.g., Z-axis direction), and the driving unit moving the lens barrel 530. The driving unit of the second lens actuator 500 may include a driving wire 511 a length of which is changed when the voltage or the current is applied thereto, a crank gear 514 rotated in series by being connected to the driving wire 511, a pulley gear 521, a sub-pulley gear 522, a guide gear 524, a guide wire 523, and a wire fixation member 512. The crank gear 514, the pulley gear 521, the sub-pulley gear 522 and the guide gear 524 may respectively be supported by a crankshaft 515a, a pulley shaft 525a, a sub-pulley shaft 526a and a guide gear shaft 527a to be rotated on the inner surface of the housing 100. The lens barrel 530 and the driving unit, included in the second lens actuator 500, correspond to the lens barrel 430 and driving unit of the lens actuator 400, described with reference to FIGS. 3 through 6D, and redundant descriptions thereof are thus omitted.

The driving unit included in the first lens actuator 400 and the driving unit included in the second lens actuator 500 may respectively be positioned in different spaces in the housing 100. For example, as shown in FIG. 7, the driving unit included in the first lens actuator 400 may be positioned on a right inner surface of the housing based on the optical axis direction (e.g., Z-axis direction), and the driving unit included in the second lens actuator 500 may be positioned on a left inner surface of the housing. Accordingly, the driving units may respectively drive the lens barrels 400 and 500 without interfering each other.

The lens barrel 430 included in the first lens actuator 400 and the lens barrel 530 included in the second lens actuator 500 may be aligned with each other for their optical axes to coincide with each other, and may thus be moved in the housing 100 in the same optical axis. The guide rails 111 and 112 guiding the respective movement of the lens barrels 430 and 530 may be positioned in the housing 100. In addition, the guide grooves 432 and 532 respectively accommodating the guide rails 111 and 112 may be positioned in the bottom surfaces of the lens barrels 430 and 530 to prevent the lens barrels 430 and 530 from being separated from the guide rails 111 and 112 by external impact, respectively. For example, as shown in FIG. 7, the first guide groove 432 may be positioned in the bottom surface of the lens barrel 430 included in the first lens actuator 400, and the second guide groove 532 may be positioned on the bottom surface of the lens barrel 530 included in the second lens actuator 500.

The driving units respectively included in the first lens actuator 400 and the second lens actuator 500 may be controlled independently of each other. For example, in the camera module 10 shown in FIG. 7, different magnitudes of the voltages or the currents may respectively be applied to the driving wire 411 included in the first lens actuator 400 and the driving wire 511 included in the second lens actuator 500. Alternatively, the same magnitude of the voltage or current may be applied to the driving wire 411 included in the first lens actuator 400 and the driving wire 511 included in the second lens actuator 500 for different times. Accordingly, the direction or distance in which the lens barrel 430 included in the first lens actuator 400 is moved may be different from the direction or distance in which the lens barrel 530 included in the second lens actuator 500 is moved.

Hereinafter, the description describes that the plurality of lenses barrels 430 and 530 included in the camera module 10 are moved with reference to FIGS. 8A and 8B. FIGS. 8A and 8B are top views each showing that the upper cover is omitted from the camera module 10, and the driving units included in the plurality of lens actuators 400 and 500 respectively move the plurality of lenses barrels 430 and 530. For example, FIGS. 8A and 8B may be views showing that the arrangement of the plurality of lens barrels 430 and 530 at different times. In the following description, the lens barrel 430 included in the first lens actuator 400 is defined as the first lens barrel 430, and the lens barrel 530 included in the second lens actuator 500 is defined as the second lens barrel 530.

The driving units included in the first lens actuator 400 and the second lens actuator 500 may be controlled independently of each other, and the first lens barrel 430 and the second lens barrel 530 may thus be moved independently of each other. For example, the driving unit of the first lens actuator 400 and the driving unit of the second lens actuator 500 may respectively move the first lens barrel 430 and the second lens barrel 530 away from the image sensor module 600 by different distances. Accordingly, two distances may be different from each other, i.e. a distance d1 (in FIG. 8A for example) between the first lens barrel 430 and the second lens barrel 530 before the lens barrels are moved and a distance d2 (in FIG. 8B for example) therebetween after the lens barrels are moved.

However, FIGS. 8A and 8B show that the camera module 10 is moved, and the operation of the driving unit included in the camera module 10 is not limited thereto. For example, the driving unit of the first lens actuator 400 may move the first lens barrel 430 closer to the image sensor module 600, and the driving unit of the second lens actuator 500 may simultaneously move the second lens barrel 530 away from the image sensor module 600. Alternatively, while the driving unit of the first lens actuator 400 moves the first lens barrel 430, the driving unit of the second lens actuator 500 may not be operated.

In the various examples, the driving unit of the first lens actuator 400 and the driving unit of the second lens actuator 500 may continuously move the first lens barrel 430 and the second lens barrel 530 in the optical axis direction (e.g., Z-axis direction). Accordingly, the camera module 10 may perform the autofocus function.

The driving unit of the first lens actuator 400 and the driving unit of the second lens actuator 500 may continuously adjust the distance between the first lens barrel 430 and the second lens barrel 530 or a distance between the second lens barrel 530 and the image sensor module 600. Accordingly, the camera module 10 may perform a continuous zoom function.

As set forth above, the lens actuator and the camera module including the same may implement the autofocus function, the zoom function and the image stabilization function by moving the plurality of lenses in the optical axis direction.

The lens actuator and the camera module including the same may move the plurality of lenses using the driving wire the length of which is changed, and the present disclosure may thus provide the lens actuator having a simple structure and high operational reliability and the camera module including the same.

The lens actuator and the camera module including the same may move the plurality of lenses using the driving wire the length of which is changed, thereby reducing power consumed as the lens is moved.

The lens actuator and the camera module including the same may move the plurality of lenses in the optical axis direction using a minute amount of the change in the length of the driving wire.

The lens actuator and the camera module including the same may move the plurality of lenses using the driving wire the length of which is changed, thereby minimizing electromagnetic interference to another electronic component.

The lens actuator and the camera module including the same may control the plurality of lenses precisely and quickly by adjusting the speed and amount of the change in the length of the driving wire.

The lens actuator and the camera module including the same may continuously move the plurality of lenses, thus easily performing the continuous zoom function.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens actuator comprising:
a lens barrel accommodating one or more lenses; and
a driving unit configured to move the lens barrel along an optical axis direction,
wherein the driving unit comprises:
a driving wire, at least a portion of which is extended in the optical axis direction, and a length of which is changed as voltage is applied thereto; and
a driving transmission unit connected to the driving wire and configured to transfer changes in the length of the driving wire to the lens barrel along the optical axis direction as the length of the driving wire is changed such that a distance the lens barrel is moved by the driving transmission unit is greater than an amount of change in the length of the driving wire, and
wherein the driving transmission unit, comprising a crank gear connected to the driving wire, is configured to rotate about a rotation axis crossing an optical axis based on contraction or extension of the driving wire.

2. The lens actuator of claim 1, wherein as the voltage is applied to the driving wire, at least a portion of the driving wire is contracted in the optical axis direction.

3. The lens actuator of claim 1, wherein the driving transmission unit further comprises:
a pulley gear configured to rotate while meshing with the crank gear; and
a guide wire connected to the pulley gear and configured to move as the pulley gear is rotated, and
the lens barrel is fixed to at least a portion of the guide wire.

4. The lens actuator of claim 3, wherein a first end of the crank gear is connected to the driving wire, a second end of the crank gear is connected with the pulley gear, and a distance from the first end of the crank gear to the rotation axis of the crank gear is shorter than a distance from the second end of the crank gear to the rotation axis of the crank gear.

5. The lens actuator of claim 4, wherein the pulley gear comprises:
a first wheel connected with the second end of the crank gear; and
a second wheel connected with the guide wire, and
an outer diameter of the second wheel is greater than an outer diameter of the first wheel.

6. The lens actuator of claim 5, wherein the second end of the crank gear and an outer ring of the first wheel of the pulley gear are teeth-coupled to each other.

7. The lens actuator of claim 3, wherein the driving wire comprises:
a first driving wire configured to rotate the crank gear in a first direction as a length of the first driving wire is reduced; and
a second driving wire configured to rotate the crank gear in a second direction opposite to the first direction as a length of the second driving wire thereof is reduced, and changes in the lengths of the first driving wire and the second driving wire are controlled independently of each other.

8. The lens actuator of claim 7, wherein one or both of the first driving wire and the second driving wire is made of a shape memory alloy, a length of which is changed when the voltage is applied thereto.

9. The lens actuator of claim 7, further comprising a wire connection member connecting one or both of the first driving wire and the second driving wire to the crank gear, wherein the wire connection member comprises a conductive material.

10. The lens actuator of claim 3, wherein the driving transmission unit comprises:
a crankshaft supporting the crank gear; and
a crank fixation member disposed at an end of the crankshaft to support the crank gear so as not to be separated from the crankshaft.

11. The lens actuator of claim 3, wherein the driving transmission unit further comprises a sub-pulley gear spaced apart from the pulley gear in the optical axis direction,
the guide wire is connected to both the pulley gear and the sub-pulley gear, and
the lens barrel is connected to the guide wire between the pulley gear and the sub-pulley gear.

12. The lens actuator of claim 11, wherein the driving transmission unit further comprises a guide gear positioned between the pulley gear and the sub-pulley gear, and configured to guide at least a portion of the guide wire to be moved in a direction parallel to the optical axis direction.

13. The lens actuator of claim 3, wherein a fixation groove, to which at least a portion of the guide wire is fixed, is disposed in an outer circumferential surface of the pulley gear.

14. A lens actuator comprising:
a lens barrel accommodating one or more lenses; and
a driving unit configured to move the lens barrel along an optical axis direction,
wherein the driving unit comprises:
a first driving wire and a second driving wire at least a portion of each of which is configured to be extended along the optical axis direction, and a length of each of which is changed as voltage is applied thereto, and
a driving transmission unit configured to transfer changes in the length of the first driving wire to the lens barrel in a first direction parallel to the optical axis direction as the length of the first driving wire is contracted, and to move the lens barrel in a second direction opposite to the first direction as the length of the second driving wire is contracted.

15. The lens actuator of claim 14, wherein the first driving wire and the second driving wire are disposed opposite to each other in a direction crossing the optical axis direction.

16. A camera module comprising one or more lens actuators of claim 14,
wherein respective driving units included in each of the one or more lens actuators are controlled independently of each other.

17. A lens actuator comprising:
a lens barrel comprising one or more lenses;
a driving wire configured to extend and contract in an optical axis direction as voltage is applied thereto; and
a driving transmission connected to the driving wire and configured to move the lens barrel along the optical axis direction as the length of the driving wire is changed such that a distance the lens barrel is moved by the driving transmission unit is greater than an amount of change in the length of the driving wire,
wherein the driving transmission comprises:
a crank gear connected to the driving wire and configured to rotate about a rotation axis crossing an optical axis; and
a pulley gear configured to rotate while meshing with the crank gear, and
wherein a first end of the crank gear is connected to the driving wire, a second end of the crank gear is connected with the pulley gear, and a distance from the first end of the crank gear to the rotation axis of the crank gear is different than a distance from the second end of the crank gear to the rotation axis of the crank gear.

18. The lens actuator of claim 17, wherein the distance from the first end of the crank gear to the rotation axis of the crank gear is less than the distance from the second end of the crank gear to the rotation axis of the crank gear.

* * * * *